United States Patent
Hayes et al.

(10) Patent No.: US 12,434,674 B2
(45) Date of Patent: Oct. 7, 2025

(54) PARK BRAKE CONTROLLER AND METHOD FOR CONTROL VERIFICATION OF AN EXTERNAL PARK BRAKE REQUEST AT SPEED

(71) Applicant: Bendix Commercial Vehicle Systems LLC, Avon, OH (US)

(72) Inventors: Thomas J. Hayes, Lakewood, OH (US); Jeswanth Samayamantula, Avon Lake, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 195 days.

(21) Appl. No.: 18/222,107

(22) Filed: Jul. 14, 2023

(65) Prior Publication Data

US 2025/0018908 A1  Jan. 16, 2025

(51) Int. Cl.
*B60T 8/17* (2006.01)
(52) U.S. Cl.
CPC .......... *B60T 8/1708* (2013.01); *B60T 2250/04* (2013.01)
(58) Field of Classification Search
CPC .................. B60T 8/1708; B60T 2250/04
USPC ............................................. 701/70
See application file for complete search history.

(56) References Cited

U.S. PATENT DOCUMENTS 6,868,323 B2 * 3/2005 Kichima ............... B60T 13/746
188/162
6,997,521 B2 * 2/2006 Jensen ...................... B60T 7/12
303/3
11,618,422 B2 * 4/2023 Scheuerell .............. B60T 8/171
701/43
2002/0026272 A1 * 2/2002 Yamamoto ............ B60T 13/662
701/70
2003/0028307 A1 * 2/2003 Sebastian ............... G01B 21/26
180/443

(Continued)

FOREIGN PATENT DOCUMENTS

CN  111273644 A  6/2020
CN  114728645 A  7/2022

(Continued)

OTHER PUBLICATIONS

International Search Report completed Oct. 18, 2024 for International Application No. PCT/US2024/035221.

(Continued)

*Primary Examiner* — Logan M Kraft
*Assistant Examiner* — John D Bailey
(74) *Attorney, Agent, or Firm* — Crowell & Moring LLP

(57) ABSTRACT

A park brake controller and method are provided for control verification handling of an external park brake request. In one embodiment, a park brake controller comprises one or more processors and a non-transitory computer-readable medium storing program instructions. The program instructions, when executed by the one or more processors, cause the one or more processors to: receive a request to park a vehicle, wherein the request is associated with a control level; receive information about a speed of the vehicle; and determine an action to take in response to the request based on the control level of the request and the speed of the vehicle. Other embodiments are provided.

12 Claims, 2 Drawing Sheets

(56) References Cited

U.S. PATENT DOCUMENTS

| | | | | |
|---|---|---|---|---|
| 2008/0087509 | A1* | 4/2008 | Kalbeck | B60T 7/12 701/70 |
| 2009/0099746 | A1* | 4/2009 | Hilberer | B60T 7/107 701/70 |
| 2011/0004386 | A1* | 1/2011 | Kinder | B60T 8/885 701/70 |
| 2012/0330522 | A1* | 12/2012 | Gibson | B60W 10/115 477/92 |
| 2014/0121930 | A1* | 5/2014 | Allexi | B62D 15/027 701/70 |
| 2014/0309900 | A1* | 10/2014 | Frashure | B60T 8/17 701/70 |
| 2015/0094925 | A1* | 4/2015 | Senoo | B60T 1/005 701/70 |
| 2015/0120163 | A1* | 4/2015 | Ohara | B60T 7/108 701/70 |
| 2016/0068158 | A1* | 3/2016 | Elwart | B60W 30/06 701/1 |
| 2019/0308599 | A1* | 10/2019 | Schmidt | B60T 15/027 |
| 2021/0188254 | A1* | 6/2021 | Kumazawa | B60K 1/00 |
| 2022/0032887 | A1* | 2/2022 | Barade | B60T 13/683 |
| 2023/0192043 | A1* | 6/2023 | Scheuerell | B60T 8/171 701/70 |
| 2024/0026647 | A1* | 1/2024 | Ikeda | E02F 9/226 |
| 2024/0123954 | A1* | 4/2024 | Li | B60T 17/221 |
| 2024/0246530 | A1* | 7/2024 | Shimomura | G08G 1/168 |
| 2024/0367628 | A1* | 11/2024 | Hempert | B60T 13/686 |

FOREIGN PATENT DOCUMENTS

| | | |
|---|---|---|
| EP | 2998177 B1 | 5/2019 |
| WO | WO 2020/207366 A1 | 10/2020 |

OTHER PUBLICATIONS

Written Opinion completed Oct. 18, 2024 for International Application No. PCT/US2024/035221.

* cited by examiner

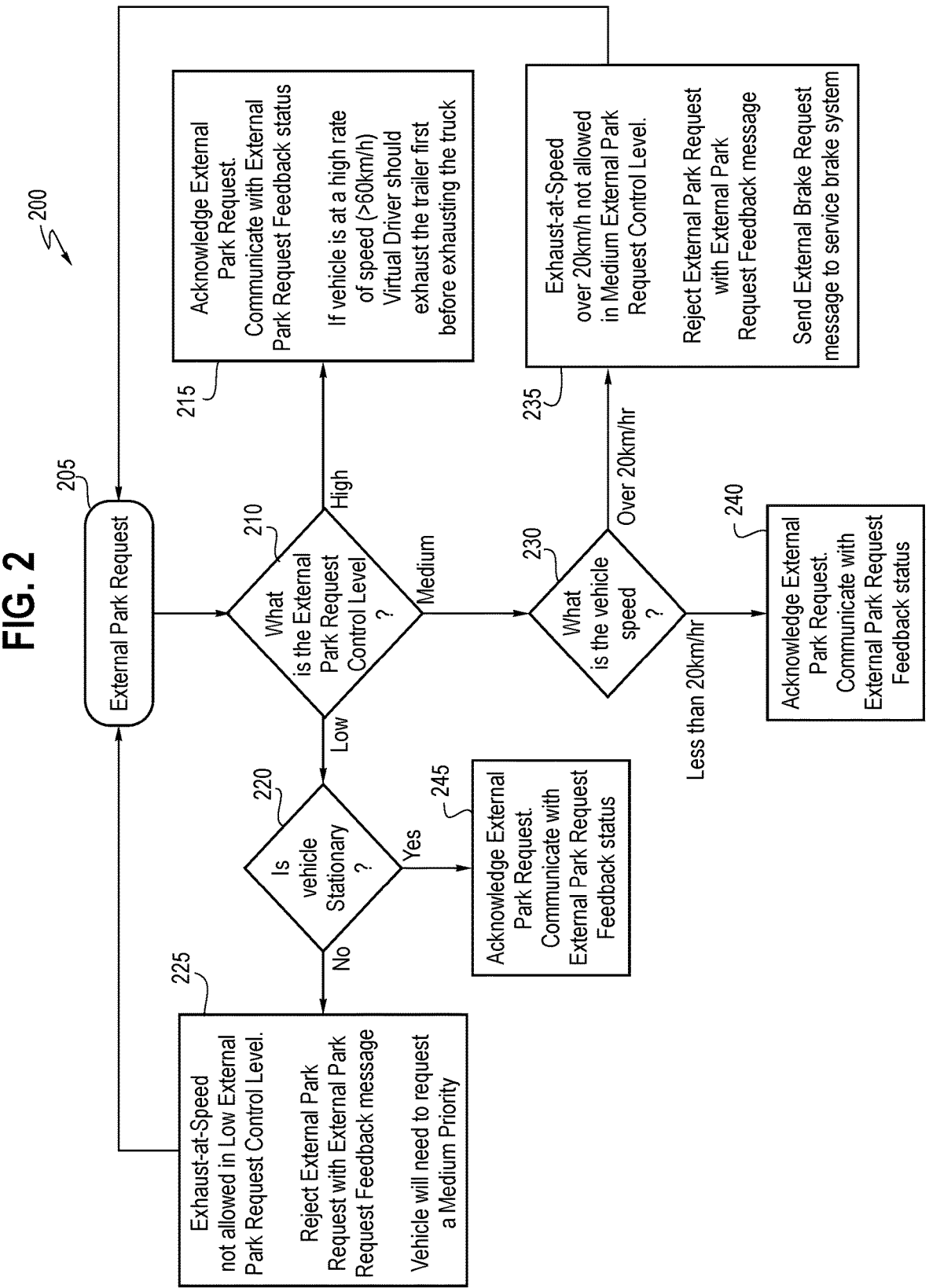

PARK BRAKE CONTROLLER AND METHOD FOR CONTROL VERIFICATION OF AN EXTERNAL PARK BRAKE REQUEST AT SPEED

BACKGROUND

Some heavy-duty commercial vehicles configured for towing a trailer can be equipped with an automated driving system that provides full or partial automatic control over acceleration, steering, and/or braking of the vehicle.

BRIEF DESCRIPTION OF THE DRAWINGS

FIG. 2 is a flow chart of a method of an embodiment for control verification handling of an external park brake request.

SUMMARY

Figure 1:
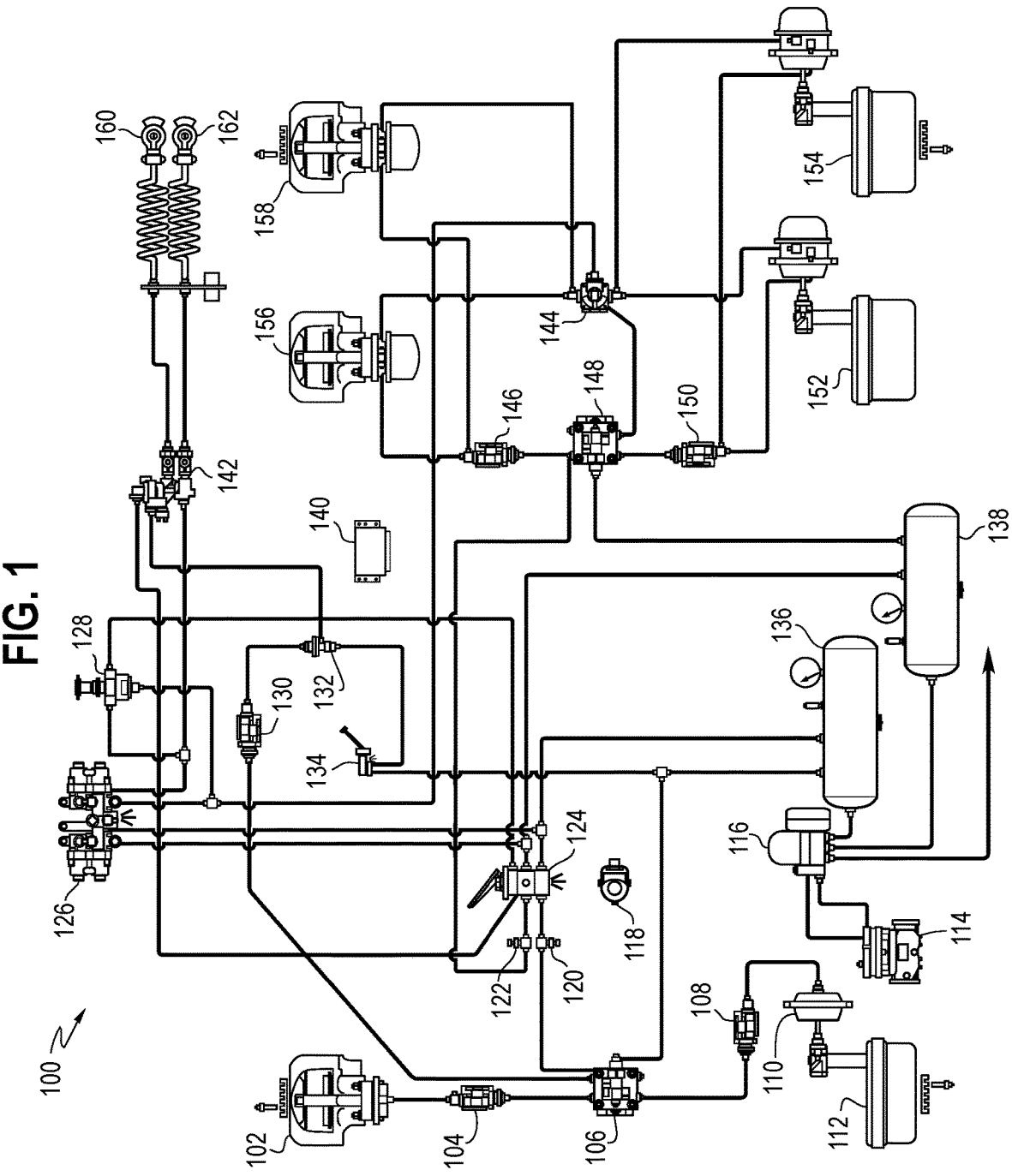
FIG. 1 is a diagram of a vehicle of an embodiment.

The following embodiments generally relate to a park brake controller and method for control verification handling of an external park brake request. In one embodiment, a park brake controller is provided comprising one or more processors and a non-transitory computer-readable medium storing program instructions. The program instructions, when executed by the one or more processors, cause the one or more processors to: receive a request to park a vehicle, wherein the request is associated with a control level; receive information about a speed of the vehicle; and determine an action to take in response to the request based on the control level of the request and the speed of the vehicle.

In another embodiment, a method is provided that is performed in a park brake controller in a vehicle. The method comprises receiving a park request associated with a control level; receiving information about a speed of the vehicle; and determining an action to take in response to the park request based on the control level and the speed of the vehicle.

In yet another embodiment, a park brake controller is provided comprising: means for receiving a request to park a vehicle, wherein the request is associated with a control level; means for receiving information about a speed of the vehicle; and means for determining an action to take in response to the request based on the control level of the request and the speed of the vehicle.

Other embodiments are possible, and each of the embodiments can be used alone or together in combination.

DETAILED DESCRIPTION

FIG. 1 is a diagram of a vehicle 100 (e.g., a tractor or truck) of an embodiment that is capable of towing a trailer. It should be understood that this is merely an example and that other/different components can be used. In this example, the tractor has a rear drive axle, a front undriven (steer) axle (more than one steer axle can be used), and one or more optional axles. It is important to note that while a tractor/truck is used in this example, these embodiments can also be applied in other vehicles.

As shown in FIG. 1, in this embodiment, the vehicle 100 comprises an air compressor 114, an air dryer 116, and front and rear air tanks 136, 138. The air compressor 114 provides compressed air to the air dryer 116, which supplies dried, compressed air to the front and rear air tanks 136, 138, which supply compressed air to the service brakes and the parking brakes, as discussed below. Compressed air can also be supplied to the transmission and accessories of the vehicle 100, as represented by the arrow at the bottom of FIG. 1.

Other components of the vehicle 100 include an air disc brake 102 (at a wheel end that has a wheel speed sensor), an antilock modulator 104, a traction relay valve 106, another modulator 108, a drum brake with an automatic slack adjuster and service chamber 110, 112, a steering angle sensor 118, a brake valve with a brake valve actuator 120, a pressure sensor 122, a foot brake module 124, a park valve modulator 126 having as associated park brake controller 140, a control valve 128, an antilock modulator 130, valves 132, 134, a tractor protection valve 142, a quick release valve 144, a rear axle module 148 with traction relay valves 146, 150, drum brakes 152, 154 with an automatic slack adjuster and service chamber (at least one of which is located at a wheel end with a wheel speed sensor), and air disc brakes 156, 158.

As mentioned above, the brake system of this embodiment can be used for service braking and parking the vehicle 100. In general, for service braking, when a driver presses the brake pedal of the foot brake module 124 or when a virtual driver requests braking, electronic signals representing the requested deceleration are generated to apply the appropriate amount of pressure needed to achieve that deceleration given various variables, such as, but not limited to, vehicle weight, weight distribution, whether a trailer is present, and driving conditions. Pneumatic signals for braking can be applied to the trailer via the pneumatic control and supply lines 160, 162.

The park brake controller 140 can be used in parking/unparking the vehicle. In general, a "controller" can comprise one or more processors that can execute computer-readable program code having instructions (e.g., modules, routines, sub-routine, programs, applications, etc.) that, when executed by the one or more processors, cause the one or more processors to perform certain functions, such as some or all of those discussed herein. The computer-readable program code can be stored in a non-transitory computer-readable storage medium, such as, but not limited to, volatile or non-volatile memory, solid state memory, flash memory, random-access memory (RAM), read-only memory (ROM), programmable read-only memory (PROM), erasable programmable read-only memory (EPROM), electronic erasable programmable read-only memory (EEPROM), and variants and combinations thereof, some or all of which can be located internal to or external to the controller. The one or more processors can also take the form of a purely-hardware implementation (e.g., an application-specific integrated circuit (ASIC)).

In this embodiment, park brake springs are used that are biased to apply pressure on braking components at the wheel ends. When the park brakes of the vehicle are applied, the park brake controller 140 provides signals to the park brake valves to exhaust air in one or more chambers of spring brake chambers. When air in the spring brake chambers is exhausted and system air pressure drops below a threshold (e.g., to less than about 25 psi to 45 psi), the parking brake springs are activated to apply the vehicle park brakes.

The park brake controller 140 can provide a signal to control the parking brake valve 126 in response to a (human or virtual) driver demand to un-park the vehicle 100 (e.g., when a human driver pushes a park/un-park button in the vehicle 100). To release the park brake, compressed air needs to flow from the front or rear tanks 136, 138 into the spring brake chambers to apply pneumatic pressure to the parking brake springs to release them from the braking position. The supply of compressed air from the front or rear tanks 136, 138 to the spring brake chambers to release the parking brake is regulated by the parking brake valve 126, which is controlled by the park brake controller 140. In some embodiments, a redundant park brake controller (not shown) is used in case there is a malfunction or other problem that prevents the park brake controller 140 from working correctly. For example, the redundant park brake controller can close solenoid valve(s) to starve the air supply of the park valve modulator 126 to isolate it from the front and rear tanks 136, 138 and exhaust the remaining pressure in the park brake system, which will apply the park brake.

In one embodiment, a user input device is provided in the cabin of the vehicle 100 to allow the driver to park/unpark the vehicle 100. For example, a button can be provided on the dash that can be pulled to apply the parking brake and pushed to release the park brake. In most situations, a driver would pull the button to park the vehicle 100 after applying the service brakes to bring the vehicle 100 to a complete stop (e.g., at the side of the road, in a parking lot, etc.). However, in some emergency-type situations (e.g., when the brake pedal falls off, when there is a hole in service air brake hoses, etc.), the driver may not be able to apply the service brakes and will need to apply the park brake even though the vehicle 100 is moving. In this example, the park brake controller 140 is a "100 percent on" or "100 percent off," meaning that there is no proportional control over the park brake. As such, applying the park brake will result in immediate locking of the wheels. So, depending on the speed of the vehicle 100, applying the park brake while the vehicle 100 is moving may result in a loss of stability of the vehicle 100 and/or a loss of the driver's control of the vehicle 100. An experienced driver can keep all these risks in mind in determining if and when to apply the park brake.

Modern vehicles are increasing being equipped with an automated driving system. As used herein, an automated driving system can comprise one or more processors that can execute computer-readable program code to provide fully-automatic or partially-automatic control over the acceleration, steering, and/or braking of the vehicle. As used herein, a "virtual driver" refers to an instantiation of a computer mechanism for providing such control. The processor(s) that provide the automated driving system can communicate with the park brake controller over a wired or wireless communication system. In one embodiment, the components communicate over a controller area network (CAN) in the vehicle 100, although a local interconnect network (LIN), Ethernet, wireless signals, etc. can be used.

Unlike a human driver, the virtual driver may not know or consider the risks associated with applying the park brake while the vehicle 100 is moving. Instead, when the virtual driver decides, for whatever reason, that the park brake should be applied, the virtual driver sends an "external park brake request" ("external" because the request is not coming from a human driver) to the park brake controller 140, which can automatically respond to the request by applying the park brakes. As noted above, this can result in an unsafe condition.

To address this problem, the virtual driver provides a control level along with the park brake request. The level can be of any suitable granularity. In the examples that follow, "low," "medium," and "high" are used, although more or fewer levels can be used. The control level can be communicated to the park brake controller 140 in the same electronic message (e.g., as metadata) as the park brake request or can be a separate communication. In one embodiment, the control level is protected with parity bits to provide end-to-end protection of the data. The park brake controller 140 can also receive information about the speed of the vehicle 100 (e.g., from one or more of the wheel speed sensors of the vehicle 100). In one embodiment, the information about the speed of the vehicle 100 is protected with parity bits to provide the same or similar end-to-end protection that is used to transmit the external park brake control level. This can qualify the messages as Automotive Safety Integrity Level (ASIL) D compliant, which is currently the highest level of safety requirements and is directed to situations that may result in life-threatening or fatal injuries if there is a malfunction in the automated driving system.

With the control level and the information about the speed of the vehicle, the park brake controller 140 can determine an action to take in response to the external park brake request. These actions include, but are not limited to, causing the vehicle 100 to park, rejecting the request, causing service brakes of the vehicle 100 to be applied, and/or causing the trailer to park before causing the tractor to park. Of course, these are merely examples, and other/different types of actions can be taken. Accordingly, a specific action or set of possible actions should not be read into the claims unless expressly recited therein.

The following is an example of one possibly implementation of these embodiments. This example is being provided for illustration purposes only and is not intended as a limitation on the claims. This example will be discussed in conjunction with the flow chart 200 in FIG. 2. As shown in FIG. 2, after the park brake controller 140 receives an external park brake request (act 205), it determines the control level of the request (act 210). As explained above, the control level message can be sent with or separate from the request. Also, in this example, three control levels are provided (high, medium, and low). As also explained above, more or fewer control levels can be used (e.g., highest, high, medium, and low).

In response to the control level being low, the park brake controller 140 determines (e.g., based on the vehicle speed) whether the vehicle 100 is stationary (act 220). If the vehicle 100 is stationary (e.g., the vehicle's speed is zero), the park brake controller 140 acknowledges the external park brake request, causes the vehicle 100 to park, and sends a feedback message to the virtual driver stating that the park brake has been or will be applied (act 245). However, if the vehicle 100 is not stationary (e.g., the vehicle's speed is non-zero), the park brake controller 140 rejects the request because, in this example, exhaust-at-speed is not allowed for a low-control level request when the vehicle 100 is not stationary. This decision can be communicated back to the virtual driver in a feedback message, which can also inform the virtual driver to increase the control level of the request if the virtual driver really needs to park the vehicle 100. Also, although the park brake request is denied, the park brake controller 140 can send an external brake request (XBR) to the service brake system asking it to slow down the vehicle 100.

In response to the control level being medium, the park brake controller 140 determines if the speed of the vehicle 100 is above a threshold (20 km/hr in this example) (act 230). If the vehicle's speed is less than the threshold, it is safe for the park brake controller 140 to apply the park brake. So, the park brake controller 140 acknowledges the external park brake request, causes the park brake to be applied, and provided feedback of such to the virtual driver (act 240). However, if vehicle's speed is above the threshold, it is unsafe to apply the park brake, as exhaust-at-speed over the threshold is not allowed in this example for a medium-level control level request. So, the park brake controller 140 rejects the request. This decision can be communicated back to the virtual driver in a feedback message, which can also inform the virtual driver to increase the control level of the request if the virtual driver really needs to park the vehicle 100. Also, although the park brake request is denied, the park brake controller 140 can send an external brake request (XBR) to the service brake system asking it to slow down the vehicle 100.

In response to the control level being high, the park brake controller 140 needs to park the vehicle 100 irrespective of the vehicle's speed in this example. So, the park brake controller 140 acknowledges the external park brake request, causes the park brake to be applied, and provides feedback of such to the virtual driver (act 215). In this example, if the vehicle's speed is above a certain threshold (here, 60 km/hr), the air in the park brake chambers of the trailer can be exhausted before the exhausting the air in the park brake chambers of the tractor to provide more stability. The park brake controller 140 can provide feedback to the virtual driver that it is taking this action.

There are several alternatives that can be used with these embodiments. For example, instead of the virtual driver providing the control level with an external park brake request, a human driver can provide the control level. This can be done, for example, by the driver actuating (e.g., pushing/pulling) a user input element (e.g., a button) on the dash (e.g., three quick pulls of the button in succession can indicate a high-control level request). This may be used in a hybrid autonomy situation where a human driver (an "on-board operator (OBO)") is in the cab to supervise the autonomous driving. The park brake controller 140 can know whether a virtual driver set the control level or the OBO set the control level and act on it accordingly. As another example, instead of the virtual driver providing the external park brake request, a human driver can provide the park brake request and signal the control level for that request.

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A park brake controller comprising:
    one or more processors;
    a non-transitory computer-readable medium; and
    program instructions stored on the non-transitory computer-readable medium that, when executed by the one or more processors, cause the one or more processors to:
    receive a request to park a vehicle, wherein the request is initiated by a virtual, non-human driver of the vehicle;
    determine whether the vehicle is stationary or not stationary;
    in response to determining that the vehicle is stationary, grant the request to park the vehicle by causing engagement of a parking brake of the vehicle; and
    in response to determining that the vehicle is not stationary:
        determine whether the request to park the vehicle is associated with a relatively-low control level or a relatively-high control level;
        in response to determining that the request to park the vehicle is associated with the relatively-low control level, grant the request to park the vehicle by causing engagement of the parking brake of the vehicle only if a speed of the vehicle is below a speed threshold; and
        in response to determining that the request to park the vehicle is associated with the relatively-high control level, grant the request to park the vehicle by causing engagement of the parking brake of the vehicle even if the speed of the vehicle is not below the speed threshold.

2. The park brake controller of claim 1, wherein determining whether the vehicle is stationary or not stationary is made using information about a speed of the vehicle.

3. The park brake controller of claim 2, wherein the information about the speed of the vehicle is protected with parity bits.

4. The park brake controller of claim 1, wherein the vehicle comprises a tractor-trailer, and wherein the program instructions, when executed by the one or more processors, further cause the one or more processors to cause the trailer to park by causing air in a park brake chamber of the trailer to be exhausted before causing the tractor to park by causing air in a park brake chamber of the tractor to be exhausted.

5. The park brake system of claim 1, wherein the relatively-low control level or the relatively-high control level is indicated by a pattern of human driver actuations of a user input element.

6. A method comprising:
    performing in a park brake controller in a vehicle:
    receiving a request to park the vehicle, wherein the request is initiated by a virtual, non-human driver of the vehicle;
    determining whether the vehicle is stationary or not stationary:
    in response to determining that the vehicle is stationary, granting the request to park the vehicle by causing engagement of a parking brake of the vehicle; and
    in response to determining that the vehicle is not stationary:
        determining whether the request to park the vehicle is associated with a relatively-low control level or a relatively-high control level;
        in response to determining that the request to park the vehicle is associated with the relatively-low control level, granting the request to park the vehicle by causing engagement of the parking brake of the vehicle only if a speed of the vehicle is below a speed threshold; and in response to determining that the request to park the vehicle is associated with the relatively-high control level, granting the request to park the vehicle by causing engagement of the parking brake of the vehicle even if the speed of the vehicle is not below the speed threshold.

7. The method of claim 6, wherein determining whether the vehicle is stationary or not stationary is made using information about a speed of the vehicle.

8. The method of claim 7, wherein the information about the speed of the vehicle is protected with parity bits.

9. The method of claim 6, wherein the relatively-low control level or the relatively-high control level is indicated by a pattern of human driver actuations of a user input element.

10. The method of claim 6, wherein further comprising causing service brakes of the vehicle to be applied.

11. The method of claim 6, wherein the vehicle comprises a tractor-trailer, and wherein the method further comprises causing the trailer to park by causing air in a park brake chamber of the trailer to be exhausted before causing the tractor to park by causing air in a park brake chamber of the tractor to be exhausted in response to the speed of the vehicle being above a threshold.

12. A park brake controller comprising:
 means for receiving a request to park the vehicle, wherein the request is initiated by a virtual, non-human driver of the vehicle;
 means for determining whether the vehicle is stationary or not stationary:
 means for in response to determining that the vehicle is stationary, granting the request to park the vehicle by causing engagement of a parking brake of the vehicle; and
 means for in response to determining that the vehicle is not stationary:
  determining whether the request to park the vehicle is associated with a relatively-low control level or a relatively-high control level;
  in response to determining that the request to park the vehicle is associated with the relatively-low control level, granting the request to park the vehicle by causing engagement of the parking brake of the vehicle only if a speed of the vehicle is below a speed threshold; and
  in response to determining that the request to park the vehicle is associated with the relatively-high control level, granting the request to park the vehicle by causing engagement of the parking brake of the vehicle even if the speed of the vehicle is not below the speed threshold.

* * * * *